(12) United States Patent
William et al.

(10) Patent No.: US 6,635,314 B1
(45) Date of Patent: Oct. 21, 2003

(54) HIGH SOLIDS CLEAR COATING COMPOSITION

(75) Inventors: Uhlianuk Peter William, Romeo, MI (US); Isao Nagata, Troy, MI (US); Jun Lin, Madison Heights, MI (US); Donald Albert Pacquet, Jr., Troy, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/913,567

(22) PCT Filed: Mar. 16, 2000

(86) PCT No.: PCT/US00/06951

§ 371 (c)(1),
(2), (4) Date: Aug. 13, 2001

(87) PCT Pub. No.: WO00/55269

PCT Pub. Date: Sep. 21, 2000

Related U.S. Application Data

(60) Provisional application No. 60/163,267, filed on Nov. 3, 1999, and provisional application No. 06/124,850, filed on Mar. 17, 1999.

(51) Int. Cl.$^7$ .............................................. C09D 161/28
(52) U.S. Cl. ................. 427/385.5; 427/388.3; 525/509; 525/520; 528/73
(58) Field of Search .................. 528/73; 525/509, 525/520; 427/385.5, 388.3

(56) References Cited

U.S. PATENT DOCUMENTS

| | | |
|---|---|---|
| 3,928,299 A | 12/1975 | Rosenkranz et al. |
| 3,954,900 A | 5/1976 | Schmalz et al. |
| 4,064,110 A | 12/1977 | Arlt et al. |
| 4,315,091 A | 2/1982 | Steinberger et al. |
| 4,403,086 A | 9/1983 | Holubka et al. |
| 4,440,937 A | 4/1984 | Krimm et al. |
| 4,499,150 A | 2/1985 | Dowbenko et al. |
| 4,533,716 A | 8/1985 | Okoshi et al. |
| 4,632,964 A | 12/1986 | Altschuler et al. |
| 4,760,108 A | 7/1988 | Asano et al. |
| 4,772,666 A | 9/1988 | Just et al. |
| 4,820,830 A | 4/1989 | Blank |
| 4,849,480 A | 7/1989 | Antonelli et al. |
| 4,960,828 A | 10/1990 | Higuchi et al. |
| 5,010,140 A | 4/1991 | Antonelli et al. |
| 5,051,473 A | 9/1991 | Tabuchi et al. |
| 5,059,670 A | 10/1991 | Harris |
| 5,169,719 A | 12/1992 | Balatan |
| 5,182,174 A | 1/1993 | Stephenson |
| 5,230,962 A | 7/1993 | Stephenson |
| 5,279,862 A | 1/1994 | Corcoran et al. |
| 5,281,443 A | 1/1994 | Briggs et al. |
| 5,336,566 A | 8/1994 | Rehfuss |
| 5,356,669 A | 10/1994 | Rehfuss |
| 5,373,069 A | 12/1994 | Rehfuss et al. |
| 5,446,110 A | 8/1995 | Nakano et al. |
| 5,510,443 A | 4/1996 | Shaffer et al. |
| 5,512,639 A | 4/1996 | Rehfuss et al. |
| 5,646,213 A | 7/1997 | Guo |
| 5,665,433 A | 9/1997 | Moussa et al. |
| 5,684,084 A | 11/1997 | Lewin et al. |
| 5,719,237 A | 2/1998 | Rehfuss et al. |
| 5,726,246 A | 3/1998 | Rehfuss et al. |
| 5,744,550 A | 4/1998 | Menovcik et al. |
| 5,747,590 A | 5/1998 | Corcoran et al. |
| 5,760,127 A | 6/1998 | Bammel et al. |
| 5,763,528 A | 6/1998 | Barsotti et al. |
| 5,837,795 A * | 11/1998 | Lomoelder .................. 528/62 |
| 5,853,809 A | 12/1998 | Campbell et al. |
| 5,872,195 A | 2/1999 | Green et al. |
| 5,886,125 A | 3/1999 | Huybrechts |
| 5,891,981 A | 4/1999 | Mauer et al. |
| 5,965,272 A | 10/1999 | Donnelly et al. |
| 6,013,326 A * | 1/2000 | Flosbach ................. 427/407.1 |
| 6,143,367 A * | 11/2000 | Bartol .................... 427/388.2 |
| 6,221,494 B1 | 4/2001 | Barsotti et al. |

FOREIGN PATENT DOCUMENTS

| | | |
|---|---|---|
| DE | 4124688 A1 | 1/1993 |
| DE | 19529124 * | 11/1996 |
| EP | 0017187 A1 | 10/1980 |
| EP | 0135741 * | 4/1985 |
| EP | 0179281 A1 | 4/1986 |
| EP | 0257848 A2 | 3/1988 |
| EP | 0272664 A2 | 6/1988 |
| EP | 0562577 | 9/1993 |
| EP | 078159 A | 4/1996 |
| FR | 2265828 A | 10/1975 |
| FR | 2392090 A | 12/1978 |
| JP | 05271608 A | 10/1993 |
| JP | 06256714 | 9/1994 |
| JP | 07233348 | 9/1995 |
| JP | 10045867 | 2/1998 |
| WO | WO 9625466 A1 | 8/1996 |
| WO | WO 9634905 A | 11/1996 |
| WO | WO 9722647 A1 | 6/1997 |
| WO | 98/27134 * | 6/1998 |
| WO | WO 9919411 A | 4/1999 |

OTHER PUBLICATIONS

Yasushi Nakate, Sep. 6, 1978, High–Solid Urethane Coating Compositions, JP53 102332 Translation (XP–002143021, 6001 Chemical Abstract vol. 90 (1979) No. 2, pp. 78).

Uses and Abuses of Photon Correlation Spectroscopy in Particle Sizing by Weiner et al. 1987 edition of American Chemical Society Symposium series, pp. 48–61.

Copy of International Search Report, International Application No. PCT/US 00/06951, filing date Mar. 16, 2000.

* cited by examiner

*Primary Examiner*—Patricia A. Short
(74) *Attorney, Agent, or Firm*—Sudhir G. Deshmukh

(57) ABSTRACT

The present invention provides for a clear coating composition most suitable for use as a top clear coat in multi-layered OEM or refinish automotive coatings. The coating composition includes isocyanate and melamine components. The isocyanate component includes an aliphatic polyisocyanate. The composition may be formulated as a two-pack or one-pack coating composition, wherein the isocyanate functionalities are blocked with a blocker such as a monoalcohol.

21 Claims, No Drawings

HIGH SOLIDS CLEAR COATING COMPOSITION

CROSS-REFERENCE TO PARENT APPLICATIONS

This application is a 35 U.S.C. §371 of PCT/US00/06951 filed on Mar. 16, 2000, which claims benefit of provisional Application Serial Nos. 60/124,850, filed Mar. 17, 1999 and 60/163,267, filed Nov. 3, 1999.

BACKGROUND OF THE INVENTION

The present invention generally relates to high solids, low VOC (volatile organic component) coating compositions and more particularly to low VOC clear coating compositions suited for multi-layered coatings used in automotive OEM and refinish applications.

Basecoat-clearcoat systems have found wide acceptance in the automotive finishes market. Continuing effort has been directed to improve the overall appearance, the clarity of the topcoat, and the resistance to deterioration of these coating systems. Further effort has also been directed to the development of coating compositions having low volatile organic content (VOC). A continuing need still exists for clear coating formulations having an outstanding balance of performance characteristics after application, particularly solvent, and mar and acid etch resistance. Melamine/acrylic polyol crosslinked or melamine self-condensed coatings for example, may provide coatings having acceptable mar but such coatings have poor acid etch resistance. On the other hand, isocyanate/acrylic polyol based 2K urethane coatings generally provide acceptable acid-etch resistance but such coatings have poor mar resistance. Therefore, a need still exists for coatings that not only provide acceptable mar resistance, but also provide acceptable acid-etch resistance.

One approach described by Ntsihlele and Pizzi in an article titled "Cross-Linked Coatings by Co-Reaction of Isocyanate-Methoxymethyl Melamine Systems"*(Journal of Applied Polymer Science, Volume 55, Pages 153–161-1995) provides for reacting aromatic diisocyanate with methoxymethyl melamine. However, a need still exists for a high solids clear coating composition, which upon a long term exposure to sunlight does not yellow or become brittle.

STATEMENT OF THE INVENTION

The present invention is directed to a clear coating composition comprising isocyanate and melamine components wherein the isocyanate component comprises an aliphatic polyisocyanate having on an average 2 to 6 isocyanate functionalities.

The present invention is also directed to a method of producing a clear coating on a substrate comprising:
applying a layer of a clear coating composition comprising isocyanate and melamine components wherein the isocyanate component comprises an aliphatic polyisocyanate having on an average 2 to 6 isocyanate functionalities; and
curing the layer into the clear coating.

One of the advantages of the present invention is its low VOC, which is significantly below the current guidelines of Environment Protection Agency (EPA) of the United States.

Another advantage is the mar and etch resistance and hardness of the coating resulting from the coating composition of the present invention.

Yet another advantage is the clarity and high gloss of the coating resulting from the coating composition of the present invention. As used herein:

"Two-pack coating composition" means a thermoset coating composition comprising two components stored in separate containers. These containers are typically sealed to increase the shelf life of the components of the coating composition. The components are mixed prior to use to form a pot mix. The pot mix has a limited potlife typically of minutes (15 minutes to 45 minutes) to a few hours (4 hours to 6 hours). The pot mix is applied as a layer of desired thickness on a substrate surface, such as an autobody. After application, the layer is cured under ambient conditions or cure-baked at elevated temperatures to form a coating on the substrate surface having desired coating properties, such as high gloss, mar-resistance and resistance6 environmental etching.

"One-pack coating composition" means a thermoset coating composition comprising two components that are stored in the same container. However, the one component is blocked to prevent premature crosslinking. After the application of the one-pack coating composition on a substrate, the layer is exposed to elevated temperatures to unmask the blocked component. Thereafter, the layer is bake-cured at elevated temperatures to form a coating on the substrate surface having desired coating properties, such as high gloss, mar-resistance and resistance to environmental etching.

"Low VOC coating composition" means a coating composition that includes less then 0.48 kilogram of organic solvent per liter (4 pounds per gallon) of the composition, as determined under the procedure provided in ASTM D3960.

"High solids composition" means a coating composition having a solid component in the range of from 65 to 100 percent and preferably greater than 70 percent, all in weight percentages based on the total weight of the composition.

"Clear coating composition" means a clear coating composition that produces upon cure, a clear coating having DOI (distinctness of image) rating of more than 80 and 20° gloss rating of more than 80.

"GPC weight average molecular weight" and "GPC number average molecular weight" means a weight average molecular weight and a weight average molecular weight, respectively measured by utilizing gel permeation chromatography. A high performance liquid chromatograph (HPLC) supplied by Hewlett-Packard; Palo Alto, Calif. was used. Unless stated otherwise, the liquid phase used was tetrahydrofuran and the standard was polymethyl methacrylate.

"Polymer particle size" means the diameter of the polymer particles measured by using a Brookhaven Model BI-90 Particle Sizer supplied by Brookhaven Instruments Corporation, Holtsville, N.Y. The sizer employs a quasi-elastic light scattering technique to measure the size of the polymer particles. The intensity of the scattering is a function of particle size. The diameter based on an intensity weighted average is used. This technique is described in Chapter 3, pages 48–61, entitled Uses and Abuses of Photon Correlation Spectroscopy in Particle Sizing by Weiner et al. In 1987 edition of American Chemical Society Symposium series.

"Polymer solids" or "composition solids" means a polymer or composition in its dry state.

"Aliphatic" as employed herein includes aliphatic and cycloaliphatic materials.

"Crosslinkable" means that the individual components of the adduct contain functionalities which react within the composition of the invention to give a coating of good appearance, durability, hardness and mar resistance.

"Acid etch resistance" refers to the resistance provided by a coated surface against chemical etching action by the environment, such for example acid rain.

"Mar resistance" refers to the resistance provided by coating to mechanical abrasions, such as, for example, the abrasion of a coated surface, such as an automotive body, that typically occurs during washing and cleaning of the coated surface.

Applicants have unexpectedly discovered that contrary to conventional approaches used in typical thermoset coating compositions, i.e., those involving polymers and crosslinking components, a very viable route lies in a combination of what would traditionally be considered as crosslinking agents for producing a unique low VOC high solids clear coating composition that produces coatings having superior coating properties, such as clarity, and mar and etch resistance.

The clear coating composition includes isocyanate and melamine components. The isocyanate component includes an aliphatic polyisocyanate having on an average 2 to 6, preferably 2.5 to 6 and more preferably 3 to 4 isocyanate functionalities. The coating composition includes in the range of from 5 percent to 95 percent, preferably in the range of from 25 percent to 90 percent, and most preferably in the range of 50 percent to 70 percent of the aliphatic polyisocyanate, the percentages being in weight percentages based on the total weight of composition solids.

Examples of suitable aliphatic polyisocyanates include aliphatic or cycloaliphatic di-, tri- or tetra-isocyanates, which may or may not be ethylenically unsaturated, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane 4,4'-diisocyanate, meta-tetramethylxylylene diisocyanate, polyisocyanates having isocyanurate structural units such as the isocyanurate of hexamethylene diisocyanate and isocyanurate of isophorone diisocyanate, the adduct of 2 molecules of a diisocyanate, such as hexamethylene diisocyanate, uretidiones of hexamethylene diisocyanate, uretidiones of isophorone diisocyanate or isophorone diisocyanate, and a diol such as ethylene glycol, the adduct of 3 molecules of hexamethylene diisocyanate and 1 molecule of water (available under the trademark Desmodur N of Bayer Corporation, Pittsburgh, Pa.).

Aromatic polyisocyanates are not suitable for use in the present invention as the clear coatings resulting therefrom are too light sensitive and tend to yellow with age and crack upon long term exposure to sunlight. As a result such clear coatings are not durable.

If desired, the isocyanate functionalities of the polymeric isocyanate may be capped with a monomeric alcohol to prevent premature crosslinking in a one-pack composition. Some suitable monomeric alcohols include methanol, ethanol, propanol, butanol, isopropanol, isobutanol, hexanol, 2-ethylhexanol and cyclohexanol.

The melamine component of the coating composition includes suitable monomeric or polymeric melamines or a combination thereof. Alkoxy monomeric melamines are preferred. The coating composition includes in the range of from 5 percent to 95 percent, preferably in the range of from 10 percent to 75 percent, and most preferably in the range of from of 30 percent to 50 percent of the melamine, the percentages being in weight percentages based on the total weight of composition solids.

In the context of the present invention, the term "alkoxy monomeric melamine" means a low molecular weight melamine which contains, on an average three or more methylol groups etherized with a $C_{1\ to\ 5}$ monohydric alcohol such as methanol, n-butanol, isobutanol or the like per triazine nucleus, and has an average degree of condensation up to 2 and preferably in the range of 1.1 to 1.8, and has a proportion of mononuclear species not less than 50 percent by weight. The polymeric melamines have an average degree of condensation of more than 1.9

Some of such suitable monomeric melamines include highly alkylated melamines, such as methylated, butylated, isobutylated melamines and mixtures thereof. More particularly hexamethylol melamine, trimethylol melamine, partially methylated hexamethylol melamine, and pentamethoxymethyl melamine are preferred. Hexamethylol melamine and partially methylated hexamethylol melamine are more preferred and hexamethylol melamine is most preferred.

Many of these suitable monomeric melamines are supplied commercially. For example, Cytec Industries Inc., West Patterson, N.J. supplies Cymel® 301 (degree of polymerization of 1.5, 95% methyl and 5% methylol), Cymel® 350 (degree of polymerization of 1.6, 84% methyl and 16% methylol), 303, 325, 327 and 370, which are all monomeric melamines. Another suitable monomeric melamine includes high amino (partially alkylated, —N, —H) melamine known as Resimene™ BMP5503 (molecular weight 690, polydispersity of 1.98, 56% buytl, 44% amino), which is supplied by Solutia Inc., St. Louis, Mo., or Cymel® 1.158 provided by Cytec Industries Inc., West Patterson, N.J.

Cytec Industries Inc. also supplies Cymel® 1130 @ (80 percent solids (degree of polymerization of 2.5), Cymel® 1133 (48% methyl, 4% methylol and 48% butyl), both of which are polymeric melamines.

The coating composition preferably includes one or more catalysts to enhance crosslinking of the components on curing. Generally, the coating composition includes in the range of from 0.001 percent to 5 percent, preferably in the range of from 0.1 to 2 percent, more preferably in the range of from 0.5 percent to 2 percent and most preferably in the range of from 0.5 percent to 1.2 percent of the catalyst, the percentages being in weight percentages based on the total weight of composition solids.

Some of the suitable catalysts include the conventional acid catalysts, such as blocked aromatic sulfonic acids, for example dodecylbenzene sulfonic acid, para-toluenesulfonic acid and dinonylnaphthalene sulfonic acid either blocked or unblocked with an amine, such as dimethyl oxazolidine and 2-amino-2-methyl-1-propanol. Other acid catalysts that can be used are strong acids, such as phosphoric acids, more particularly phenyl acid phosphate.

In addition to the foregoing, the coating composition preferably includes a small amount of one or more organo tin catalysts, such as dibutyl tin dilaurate, dibutyl tin diacetate, stannous octate, and dibutyl tin oxide. Dibutyl tin dilaurate is preferred. The amount of organo tin catalyst added generally ranges from 0.001 percent to 0.5 percent, preferably from 0.05 percent to 0.2 percent and more preferably from 0.1 percent to 0.15 percent the percentages being in weight percentages based on the total weight of composition solids.

These catalysts are preferably added to the melamine component.

The coating composition of the present invention, which is formulated into high solids coating systems further contains at least one organic solvent typically selected from the group consisting of aromatic hydrocarbons, such as petroleum naphtha or xylenes; ketones, such as, methyl amyl ketone, methyl isobutyl ketone, methyl ethyl ketone or acetone; esters, such as, butyl acetate or hexyl acetate; and glycol ether esters, such as propylene glycol monomethyl ether acetate. The amount of organic solvent added depends upon the desired solids level as well as the desired amount of VOC of the composition. If desired, the organic solvent may be added to both components of the binder. The amount of organic solvent used results in the composition having a VOC of less than 0.48 kilogram (4 pounds per gallon), preferably in the range of 0.1 kilogram to 0.4 kilogram (1 pound to 3 pounds per gallon) of an organic solvent per liter of the composition.

The coating composition of the present invention may also contain conventional additives, such as stabilizers, and rheology control agents, flow agents, and toughening agents. Such additional additives will, of course, depend on the intended use of the coating composition. Any additives that would adversely effect the clarity of the cured coating will not be included as the composition is used as a clear coating. The foregoing additives may be added to either component or both, depending upon the intended use of the coating composition.

The clear coating composition of the present invention may be supplied in the form of a two-pack coating composition in which the first-pack includes the polyisocyanate component and the second-pack includes the melamine component. Generally the first and the second pack are stored in separate containers and mixed before use. The containers are preferably sealed air tight to prevent degradation during storage. The mixing may be done, for example, in a mixing nozzle or in a container.

Alternatively, when the isocyanates functionalities of the polyisocyanate are blocked, both the components of the coating composition can be stored in the same container in the form of a one-pack coating composition.

To improve weatherability of the clear finish of the coating composition, 0.1 to 5%, by weight, based on the weight of the composition solids, of an ultraviolet light stabilizer or a combination of ultraviolet light stabilizers may be added. These stabilizers include ultraviolet light absorbers, screeners, quenchers and specific hindered amine light stabilizers. Also, 0.1 to 5% by weight, based on the weight of the composition solids, of an antioxidant can be such as hydroxydodecyclbenzo-phenone, 2,4-dihydroxybenzophenone; triazoles, such as 2-phenyl-4-(2'-4'-dihydroxybenzoyl)triazoles; and triazines, such as 3,5-dialkyl-4-hydroxyphenyl derivatives of triazine and triazoles such as 2-(benzotriazole-2-yl)-4,6-bis (methylethyl-1-phenyl ethyl)phenol, 2-(3-hydroxy-3,5'-di-tert amyl phenyl) benzotriazole, 2-(3', 5'-bis(1,1-dimethylpropyl)-2'-hydroxyphenyl)-2H-benzotriazole, benzenepropanoic acid, 3-(2H-benzotriazol-2-yl)-5-(1,1-dimethylethyl)-4-hydroxy-$C_{7-9}$-branched alkyl esters, and 2-(3', 5'-bis(1-methyl-1-phenylethyl)-2'-hydroxyphenyl) benzotriazole.

Typical hindered amine light stabilizers are bis(2,2,6,6-tetramethylpiperidinyl)sebacate, bis(N-methyl-2,2,6,6-tetramethylpiperidinyl)sebacate and bis(N-octyloxy-2,2,6,6-tetramethylpiperidynyl)sebacate. One of the useful blends of ultraviolet light absorbers and hindered amine light stabilizers is bis(N-octyloxy-2,2,6,6-tetramethylpiperidynyl) sebacate and benzenepropanoic acid, 3-(2H-benzotriazol-2-yl)-5-(1,1-dimethylethyl)-4-hydroxy-,C7-9-branched alkyl esters. Another useful blend of ultraviolet light absorbers and hindered amine light stabilizers is 2-(3', 5'-bis(1-methyl-1-phenylethyl)-2'-hydroxyphenyl)benzotriazole and decanedioc acid, bis(2,2,6,6, -tetramethyl-4-piperidinyl) ester both supplied by Ciba Specialty Chemicals, Tarrytown, N.Y. under the trademark Tinuvin® 900 and Tinuvin® 123, respectively.

The coating composition of the present invention optionally contains in the range of from 0.1 percent to 40 percent, preferably in the range of from 5 percent to 35 percent, and more preferably in the range of from 10 percent to 30 percent of a flow modifying resin, such as a non-aqueous dispersion (NAD), all percentages being based on the total weight of composition solids. The weight average molecular weight of the flow modifying resin generally varies in the range of from 20,000 to 100,000, preferably in the range of from 25,000 to 80,000 and more preferably in the range from 30,000 to 50,000.

The non-aqueous dispersion-type resin is prepared by dispersion-polymerizing at least one vinyl monomer in the presence of a polymer dispersion stabilizer and an organic solvent. The polymer dispersion stabilizer may be any of the known stabilizers used commonly in the field of non-aqueous dispersions, and may include the following substances (1) through (9) as examples:

(1) A polyester macromer having 1.0 polymerizable double bond within the molecule as obtainable upon addition of glycidyl acrylate or glycidyl methacrylate to an auto-condensation polyester of a hydroxy-containing fatty acid such as 12-hydroxystearic acid.

(2) A comb-type polymer prepared by copolymerizing the polyester macromer mentioned under (1) with methyl methacrylate and/or other (meth)acrylic ester or a vinyl monomer.

(3) A polymer obtainable by the steps of copolymerizing the polymer described under (2) with a small amount of glycidyl (meth)acrylate and, then, adding (meth)acrylic acid to the glycidyl groups thereof so as to introduce double bonds.

(4) A hydroxy-containing acrylic copolymer prepared by copolymerizing at least 20 percent by weight of (meth) acrylic ester of a monohydric alcohol containing 4 or more carbon atoms.

(5) An acrylic copolymer obtainable by producing at least 0.3 double bond per molecule based on its number average molecular weight, into the copolymer mentioned under (4). A method for introducing double bonds may, for example, comprise copolymerizing the acrylic polymer with a small amount of glycidyl (meth)acrylate and then adding (meth) acrylic acid to the glycidyl group.

(6) An alkylmelamine resin with a high tolerance to mineral spirit (7) An alkyd resin with an oil length not less than 15 percent and/or a resin obtainable by introducing polymerizable double bonds into the alkyd resin. A method of introducing double bonds may, for example, comprise addition reaction of glycidyl (meth)acrylate to the carboxyl groups in the alkyd resin.

(8) An oil-free polyester resin with a high tolerance to mineral spirit, an alkyd resin with an oil length less than 15 percent, and/or a resin obtainable by introducing double bonds into said alkyd resin.

(9) A cellulose acetate butyrate into which polynerizable double bonds have been introduced. An exemplary method of introducing double bonds comprises addition reaction of isocyanatoethyl methacrylate to cellulose acetate butyrate.

These dispersion stabilizers can be used alone or in combination.

Among the aforementioned dispersion stabilizers, preferred for the purposes of the invention are those which can be dissolved in comparatively, low polar solvents, such as aliphatic hydrocarbons to assure the film performance requirements to some extent. As dispersion stabilizers which can meet such conditions, the acrylic copolymers mentioned under (4) and (5) are desirable in that they not only lend themselves well to adjustment of molecular weight, glass transition temperature, polarity (polymer SP value), hydroxyl value, acid value and other parameters but are excellent in weatherability. More desirable are acrylic copolymers containing an average of 0.2 to 1.2 polymerizable double bonds, per molecule, which are graft copolymerized with dispersed particles.

The non-aqueous dispersion-type resin used in accordance with this invention can be easily prepared by dispersion-polymerizing at least one vinyl monomer in the presence of the aforedescribed polymer dispersion stabilizer and an organic solvent, which mainly contains an aliphatic hydrocarbon. The dispersion stabilizer and the vinyl monomer are soluble in the organic solvent. However, the polymer particles formed by the vinyl monomer are not soluble in the solvent.

The monomer component forming the acrylic copolymer suitable as the polymer dispersion stabilizer and the vinyl monomer forming the dispersed particles may be virtually any radical polymerizable unsaturated monomer. A variety of monomers can be utilized for the purpose. Typical examples of such monomers include the following.

(a) Esters of acrylic acid or methacrylic acid, such as for example, $C_{1-18}$ alkyl esters of acrylic or methacrylic acid, such as methyl acrylate, ethyl acrylate, propyl acrylate, isopropyl acrylate, butyl acrylate, hexyl acrylate, octyl acrylate, lauryl acrylate, stearyl acrylate, methyl methacrylate, ethyl methacrylate, propyl methacrylate, isopropyl methacrylate, butyl methacrylate, hexyl methacrylate, octyl methacrylate, lauryl methacrylate, and stearyl methacrylate; glycidyl acrylate and glycidyl methacrylate; $C_{2-8}$ alkenyl esters of acrylic or methacrylic acid, such as allyl acrylate, and allyl methacrylate; $C_{2-8}$ hydroxyalkyl esters of acrylic or methacrylic acid, such as hydroxyethyl acrylate, hydroxyethyl methacrylate, hydroxypropyl acrylate, and hydroxypropyl methacrylate; and $C_{3-18}$ alkenyloxyalkyl esters or acrylic or methacrylic acid, such as allyloxyethyl acrylate, and allyloxyethyl methacrylate.

(b) Vinyl aromatic compounds, such as, for example, styrene, alpha-methylstyrene, vinyltoluene, p-chlorostyrene, and vinylpyridine.

(c) α, β-Ethylenically unsaturated acids, such as, for example, acrylic acid, methacrylic acid, itaconic acid and crotonic acid (d) Amides of acrylic or methacrylic acid, such as, for example, acrylamide, methacrylamide, n-butoxymethylacrylamide, N-methylolacrylaride, n-butoxymethylmethacrylamide, and N-methylolmethacrylamide.

(e) Others: for example, acrylonitrile, methacrylonitrile, methyl isopropenyl ketone, vinyl acetate, VeoVa monomer (product of Shell Chemicals, Co., Ltd.; mixed vinyl esters of a synthetic saturated monocarboxylic acid of highly branched structure containing ten carbon atoms), vinyl propionate, vinyl pivalate, isocyanatoethyl methacrylate, perfluorocyclohexyl (meth)acrylate, p-styrenesulfonamide, N-methyl-p-styrenesulfonamide, γ-methacryloyloxypropyl trimethoxy silane.

Among the monomers mentioned above, the following materials can be used with particular advantage for the preparation of the acrylic copolymer used as a dispersion stabilizer:

Mixed monomers based on comparatively long-chain, low-polar monomers, such as n-butyl methacrylate, 2-ethylhexyl methacrylate, dodecyl methacrylate, lauryl methacrylate, and stearyl methacrylate, supplemented as necessary with styrene, methyl (meth)acrylate, ethyl (meth) acrylate, 2-hydroxyethyl (meth)acrylate, propyl (meth) acrylate, and (meth)acrylic acid. The dispersion stabilizer may be one prepared by adding glycidyl (meth)acrylate or isocyanatoethyl methacrylate to a copolymer of the monomers for introduction of polymerizable double bonds.

The acrylic copolymer used as the dispersion stabilizer can be easily prepared using a radical polymerization initiator in accordance with the known solution polymerization process.

The number average molecular weight of the dispersion stabilizer is preferably in the range of 1,000 to 50,000 and, for still better results, 3,000 to 20,000.

Among the monomers mentioned above, particularly preferred vinyl monomers for the formation of the dispersed polymer particles predominantly contain comparatively high-polarity monomers, such as methyl (meth)acrylate, ethyl (meth)acrylate, n-butyl (meth)acrylate, and acrylonitrile, supplemented as necessary with (meth)-acrylic acid, and 2-hydroxyethyl (meth)acrylate. It is also possible to provide gel particles as cross-linked in molecules by copolymerizing a small amount of polyfunctional monomers, such as divinylbenzene, and ethylene glycol dimethacrylate, by copolymerizing a plurality of monomers having mutually reactive functional groups, such as glycidyl methacrylate and methacrylic acid, or by copolymerizing an auto-reactive monomer, such as N-alkoxymethylated acrylamides, and γ-methacryloyloxypropyl trimethoxy silanes.

In conducting the dispersion polymerization, the ratio of the dispersion stabilizer to the vinyl monomer forming dispersed particles is selected from the range of t 5/95 to 80/20 by weight, preferably 10/90 to 60/40 by weight, and the dispersion polymerization can be conducted in the presence of a radical polymerization initiator by a known procedure.

While the particle size of the resulting non-aqueous dispersion type, acrylic resin is generally in the range of 0.05 $\mu$m to 2 $\mu$m, the range of 0.1 $\mu$m to 0.7 $\mu$n is preferable from the stability of shelf life and the gloss, smoothness and weatherability of the film.

In use, the first-pack of the two-pack coating composition containing the polyisocyanate and the second-pack containing the melamine are mixed just prior to use or 5 to 30 minutes before use to form a pot mix, which has limited pot life of 10 minutes to 6 hours. Thereafter, it becomes too viscous to permit application through conventional application systems, such as spraying. A layer of the pot mix is typically applied to a substrate by conventional techniques, such as spraying, electrostatic spraying, roller coating, dipping or brushing. Generally, a clear coat layer having a thickness in the range of from 25 micrometers to 75 micrometers is applied over a metal substrate, such as automotive body, which is often pre-coated with other coating layers, such as an electrocoat, primer and a basecoat. The two pack coating composition may be baked upon application for 60 to 10 minutes at 80° C. to 160° C.

When the one-pack coating composition containing the blocked polyisocyanate is used, a layer thereof applied over a substrate using aforedescribed application techniques, is cured at a baking temperature in the range of from 80° C. to 200° C., preferably in the range of 80° C. to 160° C., for about 60 to 10 minutes. It is understood that actual baking temperature would vary. depending upon the catalyst and the amount thereof, thickness of the layer being cured and the blocked isocyanate functionalities and the melamine utilized in the coating composition. The use of the foregoing baking step is particularly useful under OEM (Original Equipment Manufacture) conditions.

The clear coating composition of the present invention is suitable for providing clear coatings on variety of substrates, such as metal, wood and concrete substrates. The present composition is especially suitable for providing clear coatings in automotive OEM or refinish applications. These compositions are also suitable as clear coatings in industrial and maintenance coating applications.

Testing Procedures

The following test procedures were used for generating data reported in the examples below:

| Test | Test Method |
|---|---|
| Dry film thickness | ASTM D1400 |
| Appearance Excellent, Good (acceptable minimum), Poor | ASTM D523, VISUAL |
| 20° Gloss A rating of at least 80 (acceptable minimum) | ASTM D523 |
| DOI A rating of at least 80 (acceptable minimum) | ASTM D5767 |
| Tukon Hardness | ASTM D1474 |
| MEK rubs | ASTM D5402 |
| Mar resistance (Dry, Wet & Bench Top Car Wash) | See below |
| Acid Etch Resistance (Gradient Bar) | See below |
| Percent solids 65 percent (acceptable minimum) | ASTM D2369 |

Crockmeter—Dry Mar Resistance

Panels, which have cured clearcoat over black basecoats were coated with a thin layer of Bon Ami abrasive supplied by Faultless Starch/Bon Ami Corporation, Kansas City, Mo. The clear coats had a dry coating thickness of 50 microns. The panels were then tested for mar damage for 10 double rubs against a green felt wrapped fingertip of A.A.T.C.C. Crockmeter (Model CM-1, Atlas Electric Devices Corporation, Chicago, Ill.). The dry mar resistance was recorded as percentage of gloss retention by measuring the 20° gloss of the marred areas versus non-marred areas of the coated panels.

Crockmeter—Wet Mar Resistance

Similar Procedure to that used in Crockmeter—Dry Mar Resistance above was used to test wet mar resistance, except the abrasive medium used was a wet alumina slurry instead of Bon Ami abrasive. The composition of the wet alumina slurry was as follows:

| Deionized Water (DI) Water | 294 g |
|---|---|
| ASE-60 ® Thickener[1] | 21 g |
| AMP-95% (10% solution in DI water)[2] | 25 g |
| Aluminum oxide (120# grit)[3] | 7 g |

[1]Associate thickener supplied by Rohm and Haas Company, Philadelphia, Pennsylvania
[2]Supplied by Aldrich Chemicals, Milwaukee, Wisconsin.
[3]Abrasive Supplied by MDC Industries, Philadelphia, Pennsylvania The pH of the slurry was maintained in the range of 7.6–8.0, and the viscosity was maintained at 125±10 poise (Brookfield #4 spindle at 10 rpm). To test the wet mar resistance, 0.7 ml of the slurry was applied over the black basecoated panels having cured clearcoats thereon. The clear coats had a dry coating thickness of 50 microns. The portions of panels coated with the slurry were then tested for mar damage for 10 double rubs against a green felt wrapped finger tip of A.A.T.C.C. Crockmeter (Model CM-1, Atlas Electric Devices). The wet mar resistance was recorded as percentage of gloss retention by measuring the 20° gloss of the marred areas versus non-marred areas of the coated panels.

Bench Top Car Wash

A bench top car wash machine was used to induce damage on black basecoated panels having cured clear coatings thereon. The method as described in General Motors Engineering Standards Specification Test GM 9707P was used to induce damage.

Gradient Bar Acid Etch Test

The lab gradient bar etch test was conducted by placing 200 μl of acid drops maintained at a temperature in the range of 45° C.–85° C. on a 5.08 cm×30.48 cm (2×12 inches) coated panel at nine spots. The acid drops simulate acid rain and contained a mixture of sulfuric acid, hydrochloric acid, and nitric acid titrated with ammonium, sodium, calcium and potassium hydroxides to pH=1. The panels were washed to remove acid from the spots after a 30-minute exposure. The acid etch resistance of the coating was noted by visually comparing acid exposed portion of the coated panel against the unexposed coated portion. The acid etch resistance was rated on a scale of 0–10 for each spot with a rating of zero for an etch free surface and a rating of ten for a severely etched surface. The final panel rating was reported as an average of rating numbers from nine spots.

The invention is illustrated in the following Examples:

EXAMPLES

The components, described in Tables 1 and 3 below, were used to produce Examples 1–4 and Comparative Examples 5–7 (All amounts are in parts by weight):

TABLE 1

| Melamine component | Example 1** | Example 2* | Example 3** |
|---|---|---|---|
| Monomeric Melamine[1] | | 23 | 25 |
| Polymeric Melamine[2] | 25 | | |
| HALS Tinuvin 123[3] | 1% nv | 1% nv | 1% nv |
| UVA Tinuvin 3843[3] | 1% nv | 1% nv | 1% nv |
| NAD[4] | 1% nv | 1% nv | 1% nv |
| Catalyst 1[5] | 3 | 1% nv | 1% nv |
| Catalyst 2[6] | 0.1 | 0.1 | 0.1 |
| Flow Aid[7] | 0.2 | 0.1 g/100 grams | 0.1 g/100 grams |
| Isocyanate component | | | |

TABLE 1-continued

| Melamine component | Example 1** | Example 2* | Example 3** |
|---|---|---|---|
| Isocyanate[8] | 100 | 68 | 75 |
| Solvent[9] | 8 | 36 | 28 |
| Isocyanate blocker[10] | | 9 | |

*Two-pack clear coating composition.
**One-pack clear coating composition.
[1]Cymel ® 301 monomeric melamine supplied by Cytec Industries Inc., West Patterson, New Jersey.
[2]BM5503 ® Polymeric melamine supplied by Solutia Inc., St Louis, Missouri.
[3]Tinuvin ® 123 supplied by Ciba Specialty Chemicals, Tarrytown, New York.
[3]Tinuvin ® 384 supplied by Ciba Specialty Chemicals, Tarrytown, New York.
[4]Non-aqueous dispersion resin (NAD) prepared in accordance with the procedure described in the U.S. Pat. No. 5,747,590 at column 8, lines 46–68 and column 9, lines 1–25, all of which is incorporated herein by reference.
[5]Dodecyl benzene sulfonic acid salt of 2-amino-2-methyl-1-propanol supplied by King Industries, Norwalk, Pennsylvania.
[6]Dibutyl tin dilaurate supplied by Air Products, Allentown, Pennsylvania.
[7]Resiflow supplied by Estron Chemicals, Inc., Parsippany, New Jersey.
[8]Desmodur ® 3300 polyisocyanate supplied by Bayer Corporation, Pittsburgh, Pennsylvania.
[9]Dibasic ester supplied by DuPont Company, Wilmington, Delaware.
[10]Butanol.

The melamine and polyisocyanate components of the two-pack coating composition of Examples 1 and 3 were mixed prior to application and a layer of reported dry thickness was hand sprayed over a metal test plaque having a pre-baked black base coat thereon. The layer was then bake cured for 30 minutes at 140° C. A layer of the one-pack coating composition of Example 2 was applied in a similar fashion and then cured at a baking temperature of 140° C. for 30 minutes. The properties of the coatings of Examples 1–3 were measured and reported in Table 2 below:

TABLE 2

| Properties | Example 1 | Example 2 | Example 3 |
|---|---|---|---|
| Dry film thickness | 32 microns | 32 microns | 38 microns |
| Appearance (Excellent, Good and Poor) | Good | Excellent | Excellent |
| 20° Gloss | 88 | 95 | 97 |
| DOI | 94 | 98 | 98 |
| Tukon, hardness | 6.47 | 7.37 | 11.90 |
| MEK, rubs | 200+ | 200+ | 200+ |
| Percent solids | 75.56 | 65.0 | 78.57 |

From the foregoing Table 2, it can be seen that the clear coating composition of the present invention not only provides for a clear coating composition at high solids level, but it also provides superior physical properties, such as hardness and solvent resistance.

TABLE 3

| Melamine Component | Example 4 | Comparative Example 5 | Comparative Example 6 | Comparative Example 7 |
|---|---|---|---|---|
| Monomeric Melamine[1] | 80 | 80 | 40 | |
| Acrylic Polyol[2] | | | 170 | 200 |
| UVA-HALS[3] | 12 | 7 | 13.4 | 13.4 |
| NAD[4] | 2.2 | 1.2 | 6.5 | 6.5 |
| Catalyst 1[5] | 10 | 4 | 6.9 | 6.9 |
| Catalyst 2[6] | 1.3 | 0.45 | 1.1 | 1.1 |
| Flow Aid[7] | 2 | 1.2 | 2.2 | 2.2 |
| Solvent[8] | 15 | 13 | 60 | 60 |

TABLE 3-continued

| Melamine Component | Example 4 | Comparative Example 5 | Comparative Example 6 | Comparative Example 7 |
|---|---|---|---|---|
| Isocyanate Component | | | | |
| Isocyanate[9] | 97 | | | 66 |
| Solvent[10] | 38 | | | 25 |

[1]Cymel ® 303 monomeric melamine supplied by Cytec Industries Inc., West Patterson, New Jersey.
[2]Described below.
[3]Solution of 20% Tinuvin ® 928 and 10% Tinuvin ® 152 in 70% Aromatic 100 Solvent. Tinuvin ® 928 and 10% Tinuvin ® 152 are supplied by Ciba Specialty Chemicals, Tarrytown, New York.
[4]Non-aqueous dispersion resin (NAD) prepared in accordance with the procedure described in the U.S. Pat. No. 5,747,590 at column 8, lines 46–68 and column 9, lines 1–25, all of which is incorporated herein by reference.
[5]Dodecyl benzene sulfonic acid salt of 2-amino-2-methyl-1-propanol (33% solids in methanol) supplied by King Industries, Norwalk, Connecticut.
[6]Albright ® Phenyl Acid Phosphate (75% solids in butanol), Product of Albright & Wilson Americas, Glen Allen, Virginia.
[7]Disparlon ® LC-955, Product of King Industries Inc, Norwalk, Connecticut.
[8]Ethyl 3-Ethoxy Propionate, Product of Eastman Chemical Company, Kingsport, Tennessee.
[9]Desmodur ® 3300 polyisocyanate supplied by Bayer Corporation, Pittsburgh, Pennsylvania.
[10]50/35/15 by weight mixture of n-butanol, xylene and Aromatic 100 hydrocarbon solvent supplied by Exxon Corporation, Irving, Texas.

Preparation of Acrylic Polyol (Used in Comparative Examples 6 and 7)

The hydroxyl functional acrylic polyol solution was prepared by copolymerizing 104 parts of a mixture of monomer/initiator (25 parts styrene, 32 parts hydroxyethylacrylate, 43 parts n-butyl methacrylate, 4 parts Vazo® 67 intiator supplied by DuPont Company, Wilmington, Del.) in 60 parts of a refluxing mixture of 9/1 aromatic 100/n-butyl acetate solvent. The resulting resin solution was 66% solids, had a Gardner-Holt viscosity of Y-, and a Mw of 5300 as determined by GPC.

The melamine and polyisocyanate components of the two-pack coating composition of Example 4 and Comparative example 7 were mixed 30 minutes prior to application and a layer of 50 micron dry thickness was hand sprayed over a metal test plaque having a pre-baked black basecoat thereon. After a ten-minute delay, the layer applied on the metal plaque was then bake cured at temperature of 140° C. for 30 minutes.

A layer of the one-pack coating composition of Comparative Examples 5 and 6 was applied in a similar fashion and then cured at a baking temperature of 140° C. for 30 minutes. The properties of the coatings were measured and reported in Table 4 below:

TABLE 8

| | | Example 4 | Comp. Ex. 5 Good Mar | Comp. Ex. 6 Good Mar | Comp. Ex. 7 Good Etch |
|---|---|---|---|---|---|
| Hardness[1] | Tukon | 19.1 | 25 | 15.4 | 12.3 |
| 20° Gloss | | 97 | 99 | 93 | 90 |
| DOI | | 97 | 93 | 99 | 99 |
| Crockmeter-Dry Mar | | 100% | 100% | 93% | 70% |
| Crockmeter-Wet Mar | | 99% | 84% | 81% | 60% |
| BTCW | | 1 | 5 | 4 | 8 |
| Acid Etch | | 5.8 | 10 | 8 | 6 |

TABLE 8-continued

|  | Example 4 | Comp. Ex. 5 Good Mar | Comp. Ex. 6 Good Mar | Comp. Ex. 7 Good Etch |
|---|---|---|---|---|
| Solids at Spray | 72% | 78% | 56% | 55% |

[1]Conducted 96 hours after removing from the baking oven.

What is claimed is:

1. A low VOC clear high solids coating composition consisting essentially of isocyanate and melamine components wherein said isocyanate component comprises an aliphatic polyisocyanate having on an average 2.5 to 6 isocyanate functionalities, wherein said isocyanate functionalities are unblocked or blocked by reacting with a monomeric alcohol selected from the group consisting of methanol, ethanol, propanol, butanol, isopropanol, isobutanol, hexanol, 2-ethylhexanol and cyclohexanol; and wherein said melamine component comprises an alkoxy monomeric melamine, polymeric melamine, or a combination thereof.

2. The composition of claim 1 wherein said composition further comprises one or more organo tin or acid catalysts.

3. The composition of claim 2 wherein said organo tin catalyst is selected from the group consisting of dibutyl tin diacetate, dibutyl tin dilaurate, dibutyl tin oxide, stannous octate, and a combination thereof.

4. The composition of claim 2 wherein the acid catalyst is selected from the group consisting of dodecylbenzene sulfonic acid, dodecylbenzene sulfonic acid blocked with an amine, para-toluenesulfonic acid, phenyl acid phosphate, dinonylnaphthalene sulfonic acid blocked with an amine, phenyl acid phosphate and a combination thereof.

5. The composition of claim 4 wherein said amine is dimethyl oxazolidine, 2-amino-2-methyl-1-propanol, or a combination thereof.

6. The composition of claim 2, 3 or 4 wherein said composition comprises in the range of from 0.001 percent to 5.0 percent of said catalyst, all percentages being weight percentages based on the total weight of composition solids.

7. The composition of claim 1 wherein said polyisocyanate comprises one or more trimers of hexamethylene diisocyanate, isophorone diisocyanate, meta-tetramethylxylylene diisocyanate, or a combination thereof.

8. The composition of claim 1 or 3 comprises in the range of from 5 percent to 95 percent said polyisocyanate wherein all percentages are in weight based on the total weight of composition solids.

9. The composition of claim 1 or 3 comprises in the range of from 35 percent to 95 percent said polyisocyanate wherein all percentages are in weight based on the total weight of composition solids.

10. The composition of claim 1 comprises in the range of from 5 percent to 95 percent of said melamine wherein all percentages are in weight based on the total weight of composition solids.

11. The composition of claim 1 or comprises in the range of from 5 percent to 65 percent of said melamine wherein all percentages are in weight based on the total weight of composition solids.

12. The composition of claim 1 further comprising a flow modifying resin.

13. The composition of claim 1 in the form of a two-pack composition wherein a first-pack of said two-pack composition comprises said polyisocyanate component and a second-pack of said two-pack composition comprises said melamine component.

14. The composition of claim 1 wherein a VOC of said composition varies in the range of from 0.1 kilogram to 0.53 kilogram of an organic solvent per liter of the composition.

15. The clear coating composition of claim 1 wherein a clear coating on a substrate produced from said composition has a DOI rating of at least 80.

16. The composition of claim 1 further comprising ultra violet light stabilizes, light absorbers or a combination thereof.

17. A method of producing a clear coating on a substrate comprising:

applying a layer of a low VOC clear high solids coating composition consisting essentially of isocyanate and melamine components wherein said isocyanate component comprises an aliphatic polyisocyanate having on an average 2.5 to 6 isocyanate functionalities, wherein said isocyanate functionalities are unblocked or blocked by reacting with a monomeric alcohol selected from the group consisting of methanol, ethanol, propanol, butanol, isopropanol, isobutanol, hexanol, 2-ethylhexanol and cyclohexanol, and wherein said melamine component comprises a an alkoxy monomeric melamine, polymeric melamine, or a combination thereof, and curing said layer into said clear coating.

18. The method of claim 17 wherein said coating has a DOI rating of at least 80.

19. The method of claim 17 wherein said coating has a 20° gloss of at least 80.

20. The method of claim 17 wherein said isocyanate functionalities of the polyisocyanate are blocked by reacting said polyisocyanate with a monomeric alcohol.

21. The method of claim 20 wherein said curing of said layer takes place at an elevated baking temperature in the range 80° C. to 160° C.

* * * * *